Nov. 15, 1955
M. R. MOORE
2,723,714
VEHICLE WINDSHIELD PROTECTIVE CURTAIN
Filed Feb. 20, 1953
2 Sheets-Sheet 2
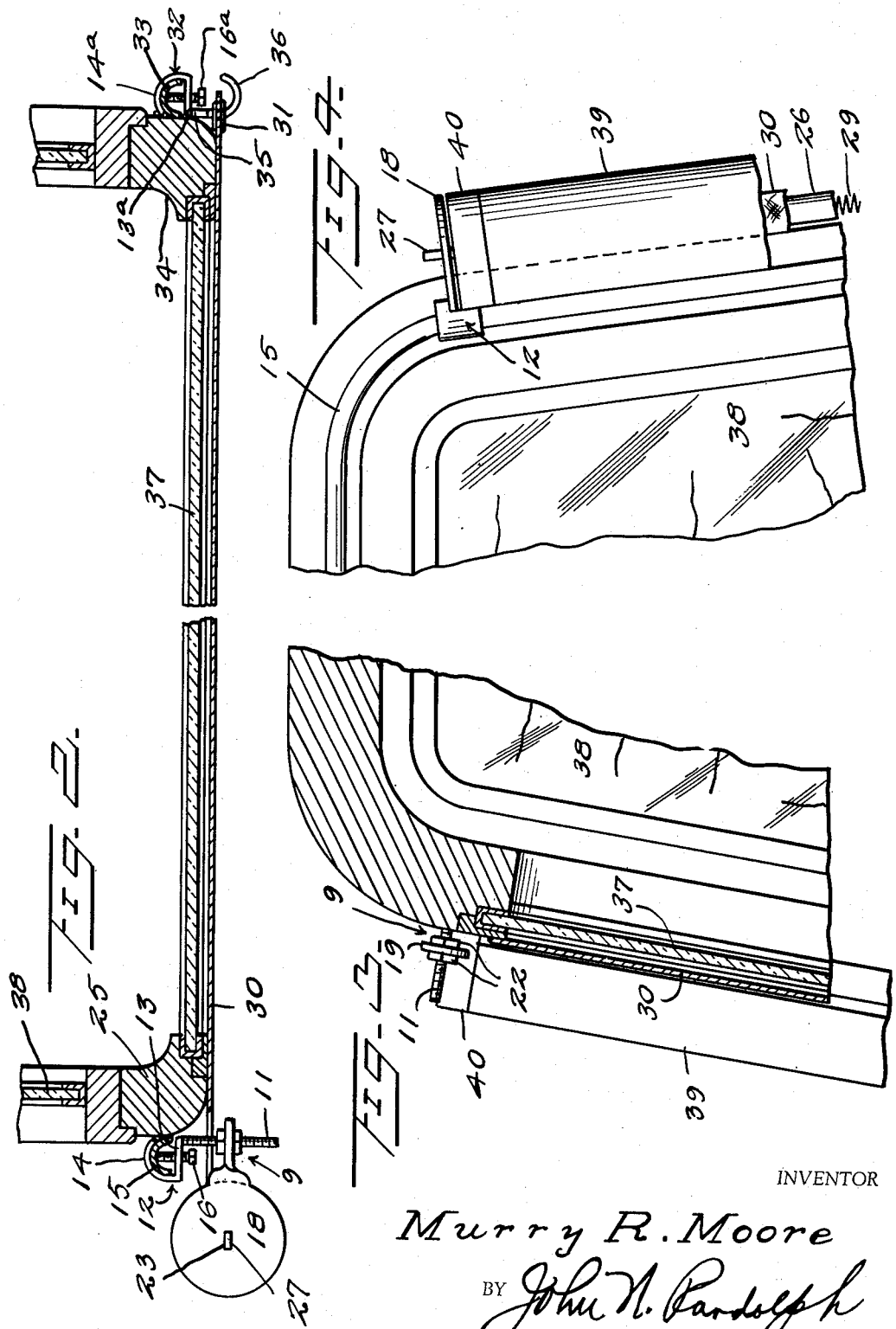
INVENTOR
Murry R. Moore
BY John N. Randolph
ATTORNEY

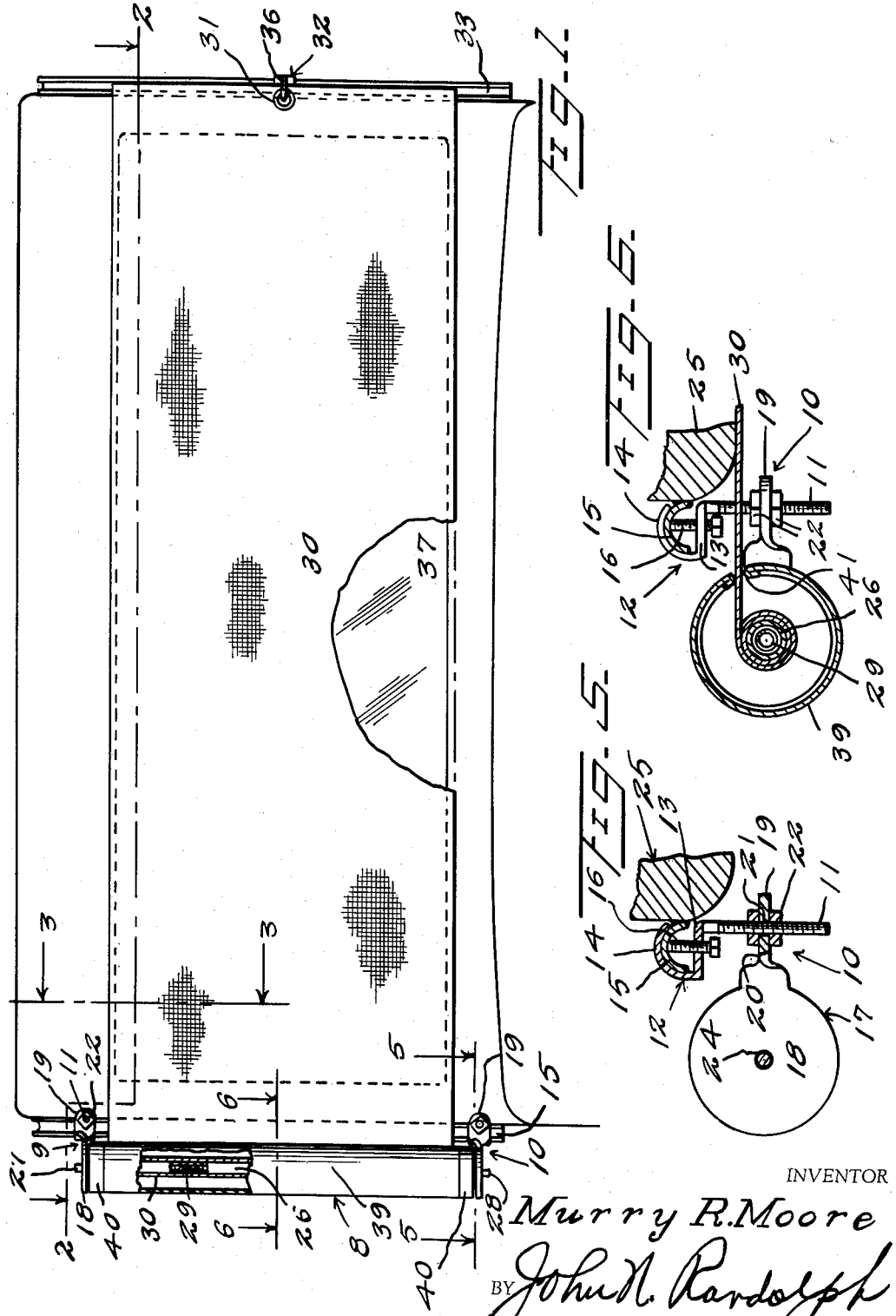

United States Patent Office 2,723,714
Patented Nov. 15, 1955

2,723,714

VEHICLE WINDSHIELD PROTECTIVE CURTAIN

Murry R. Moore, Pendleton, Oreg.

Application February 20, 1953, Serial No. 338,068

2 Claims. (Cl. 160—23)

This invention relates to a curtain for windshields to prevent the accumulation of ice, snow or frost on the windshield of a vehicle while parked out of doors and more particularly to a mounting unit for supporting the curtain and whereby the curtain may be housed, when not in use, in a readily accessible position for use on the vehicle yet in a position where the curtain and housing will not obstruct the driver's visibility.

Another object of the invention is to provide a windshield curtain and curtain mounting unit of extremely simple construction which is capable of being detachably mounted securely on a portion of one of the vehicle drain gutters and held in an extended position covering the windshield by an anchoring unit detachably fastened to the other vehicle drain gutter.

A further object of the invention is to provide novel mounting bracket means which are detachably fastened to a vehicle drain gutter for adjustably mounting the curtain, a roller on which the curtain is wound and a housing for enclosing the wound curtain.

Other objects and advantages of the invention will hereinafter become more fully apparent from the following description of the drawings, illustrating a presently preferred embodiment thereof, and wherein:

Figure 1 is a front elevational view, partly in section, showing the unit in an applied position with the curtain extended to cover a vehicle windshield;

Figure 2 is a longitudinal, horizontal sectional view, on an enlarged scale, taken substantially along a plane as indicated by the line 2—2 of Figure 1;

Figure 3 is an enlarged fragmentary vertical sectional view taken substantially along a plane as indicated by the line 3—3 of Figure 1;

Figure 4 is a fragmentary side elevational view, partly broken away, looking in the opposite direction to Figure 3 or from left to right of Figure 1; and Figures 5 and 6 are enlarged horizontal sectional views taken substantially along planes as indicated by the lines 5—5 and 6—6, respectively, of Figure 1.

Referring more specifically to the drawings, the windshield curtain and mounting unit in its entirety and comprising the invention is designated generally 8 and includes a pair of curtain roller mounting brackets 9 and 10, as best illustrated in Figures 2 and 5, respectively. Each of said brackets includes a threaded rod or bolt 11 having a unique head portion at one end thereof, designated generally 12, constituting a drain gutter engaging member and comprising a substantially rigid strip of metal having a portion 13 extending laterally from said bolt end and terminating in a turned back free end portion forming a hook 14. The portion 13 is disposed between the bolt 11 and hook 14, which hook is adapted to engage around a part of the convex outer side of a conventional drain gutter 15. The strip 13 extends transversely across and is spaced outwardly from the open front side of the gutter 15 and has a setscrew 16 extending threadedly therethrough in a direction inwardly or toward the hook portion 14. The setscrew is initially retracted away from the hook 14 when applying the head 12 to the gutter 15 and is thereafter advanced toward the hook 14 for clamping an intermediate portion of the gutter between the hook 14 and the screw 16, as illustrated in Figures 2, 5 and 6, for securing the bolt 11 immovably on the drain gutter 15 and so that it will extend outwardly from the open side of the drain gutter.

Each roller mounting bracket 9 and 10 also includes a mounting element, designated generally 17, comprising a substantially rigid plate or strip formed of metal including end portions 18 and 19 and a twisted intermediate portion 20, whereby the planes of said end portions are disposed at right angles to one another. The end portion 19 of each mounting element 17 is provided with an opening 21 which slidably fits one of the bolts 11. Each bolt 11 is provided with a pair of retaining nuts 22 between which said end 19 is disposed and clamped and which are adjustable for adjusting the position of the mounting element 17 relatively to the ends of the bolt 11. The mounting elements 17 differ only in that the portion 18 of the bracket 9 is provided with a noncircular opening 23 while the portion 18 of the bracket 10 is provided with a circular opening 24.

The mounting brackets 9 and 10 are preferably mounted on the forward portion of the right drain gutter 15 which extends downwardly along the right front corner post 25 of the motor vehicle.

A roller 26 of a conventional spring actuated type commonly referred to as a shade roller and employed for mounting window shades, is supported between the bracket portions 18. The conventional noncircular stem end 27 of the roller 26 non-turnably fits in the opening 23 of the bracket 9 and the other circular stem end 28 of said roller is journaled in the opening 24 of the bracket 10 so that the roller spring 29 is wound in a conventional manner when the roller 26 is turned in a direction for unwinding a curtain 30 therefrom. The curtain 30 which has one end fixed to the roller 26 and which is wound thereon is preferably formed of a fabric which is waterproof or at least water resistant. The other outer or free end of the curtain 30 is provided with an eye, preferably formed by a grommet 31 which is secured thereto.

A clamping head 32, corresponding to the clamping head 12 and including a hook 14a and a setscrew 16a, is secured to the other left-hand drain gutter portion 33 which extends down the left-hand front corner post 34, in the same manner that the clamps 12 are secured to the gutter 15, as previously described. In lieu of a bolt 11, the shank 35 of a hook 36 is fixed to and extends outwardly from the portion 13a of the clamp 32, the hook 36 being turned outwardly away from the roller 26.

From the foregoing it will be readily apparent that the curtain 30 may be supported wound on the roller 26 when not in use and disposed on the outer side of the right front corner post 25 so that it will not obstruct the visibility of the vehicle driver either through the vehicle windshield 37 or the window 38 of the right front vehicle door. When the vehicle is parked out of doors the curtain 30 is extended across the outer side of the windshield 37 and the grommet is engaged with the hook 36. The spring roller 26 will hold the extended curtain 30 taut over the windshield frame to prevent frost, snow or ice accumulating on the outer side of the windshield. By merely disengaging the grommet 31 from the hook 36 the curtain 30 can be re-wound on the spring roller 26 when it is desired to again use the vehicle. Obviously, if desired, the roller mounting brackets 9 and 10 could be mounted on the left gutter 33 and the hook 36 is then mounted on the right gutter 15 for reversing the mounting of the curtain 30.

The roller 26 may be enclosed in a cylindrical housing 39 having end caps 40 which are detachably secured thereto, one of which is provided with an opening corresponding to the opening 23 through which the stem 27 extends to support the housing 39 nonrotatably between the brackets 9 and 10. The stem 28 extends rotatably through the other end cap, which is disposed adjacent the bracket 10. The housing 39 has a slot 41 extending substantially from end-to-end thereof and opening toward the adjacent front vehicle corner post through which the curtain 30 slidably extends and is movable onto and off of the roller 26. The grommet 31 is thicker than the width of the slot 41 to prevent the free end of the curtain from moving into the housing 39 and so that it can be readily grasped and extended. The housing 39 is of sufficient size to accommodate the curtain and roller when the curtain is fully wound on the roller.

Various modifications and changes are contemplated and may obviously be resorted to, without departing from the spirit or scope of the invention as hereinafter defined by the appended claims.

I claim as my invention:

1. A windshield curtain and curtain mounting comprising a spring actuated roller, an elongated curtain having one end fixed to and wound on said roller, a pair of roller mounting brackets between which said roller is mounted for rotation and to one of which brackets a roller part is nonrotatably connected for tensioning a spring of the roller when the roller is turned in a direction to unwind the curtain therefrom, said brackets having clamping means for detachably and adjustably clamping the roller mounting brackets on a vehicle drain gutter portion for mounting the roller along the outer side of a front corner post of a motor vehicle, and an anchoring hook having clamping means detachably secured to the drain gutter portion of the other front corner post, the free end of said curtain having a hook engaging portion engaging said anchoring hook when the curtain is in an extended position, said anchoring hook and spring roller cooperating to maintain the curtain taut in an extended position across the outer side of a vehicle windshield and in a position overlying the windshield to prevent the accumulation of ice, snow or frost on the windshield, each of said clamping means including a clamping head having a hook portion adapted to engage around a part of the convex outer side of the drain gutter and a setscrew threadedly mounted in another portion of the clamping head and movable toward and away from said hook portion for clamping a part of the gutter between said hook portion and setscrew, each of said roller mounting brackets including a rod fixed to and extending outwardly from said last mentioned portion of the clamping head, and a roller end engaging element supported by and extending laterally from said rod.

2. A windshield curtain and mounting as in claim 1, said rod being threaded, a pair of nuts threadedly engaging the rod between which a portion of the roller end engaging element is disposed for adjustably clamping said element to the rod in different positions relatively to the clamping head.

References Cited in the file of this patent

UNITED STATES PATENTS

| | | |
|---|---|---|
| 1,298,739 | Langford | Apr. 1, 1919 |
| 1,427,038 | Toadvine | Aug. 22, 1922 |
| 2,447,246 | Groboski | Aug. 17, 1948 |
| 2,552,879 | Woerner | May 15, 1951 |
| 2,561,188 | Ferguson | July 17, 1951 |
| 2,614,630 | Moszelt | Oct. 21, 1952 |